United States Patent [19]

Reeder

[11] Patent Number: 4,998,755

[45] Date of Patent: Mar. 12, 1991

[54] SPRINKLER PIVOT JOINT

[76] Inventor: Gary M. Reeder, 9228 Cherokee Trail, Flower Mound, Tex. 75028

[21] Appl. No.: 404,259

[22] Filed: Sep. 7, 1989

[51] Int. Cl.$^5$ ............................................. F16L 43/00
[52] U.S. Cl. .................................... 285/181; 285/281
[58] Field of Search ............... 285/151, 163, 181, 274, 285/275, 168, 278, 281, 356, 423

[56] References Cited

U.S. PATENT DOCUMENTS

| | | | |
|---|---|---|---|
| 1,111,283 | 9/1914 | Alexander | 285/168 |
| 4,014,568 | 3/1977 | Carter et al. | 285/356 X |
| 4,047,739 | 9/1977 | Aitken | 285/425 X |

*Primary Examiner*—Randolph A. Reese
*Assistant Examiner*—Heather Chun
*Attorney, Agent, or Firm*—Ross, Howison, Clapp & Korn

[57] ABSTRACT

A pivoting joint for an irrigation system includes a housing (38) having a fixed end (42) and a pivoting end. The pivoting joint is generally disposed in a 90° elbow configuration with the pivoting joint formed by a stop (46), a length of pipe (50) and an O-ring (48). The stop (46) is disposed in the pivoting end of the housing (38) with the pipe (50) disposed on the interior thereof, the pipe (50) having an outer diameter that is slightly smaller than the inner diameter of the stop (46). The stop (46) is cemented to the interior walls of the housing (38) with the O-ring (48) disposed at the inner end of the stop (46). The pipe (50) has a stop (52) disposed on the interior end thereof and disposed diametrically opposite the O-ring (48) from the stop (46). The stop (52) forms a rim having an outer diameter slightly less than that of the housing (38) but greater than the interior diameter of the stop (46).

4 Claims, 1 Drawing Sheet

SPRINKLER PIVOT JOINT

TECHNICAL FIELD OF THE INVENTION

The invention pertains in general to irrigation devices and, more particularly, to a lawn sprinkler having pivoting joints associated therewith.

BACKGROUND OF THE INVENTION

In the irrigation field, lawn sprinklers are typically dispersed around a large area in order to provide irrigation therefor. In such applications as industrial complexes, etc., large equipment is typically moved over the irrigated area. This results in a high probability of contacting sprinkler heads and damaging them. The damage can either be to the sprinkler head itself or even to the underlying water pipe.

If the sprinkler head is damaged, this results in loss of pressure to multiple sprinkler heads on a given segment of the irrigation system. This also results in the loss of a great deal of water when this portion of the irrigation system is activated, since the normally restricting sprinkler head is no longer present, thus allowing the rate of flow to the damaged segment to increase dramatically. Therefore, damage to a sprinkler head in any type of irrigation system can be costly. Further, the expense and amount of effort required to replace a sprinkler head is undesirable.

One type of system that has been utilized in the past is a pivoting member that is comprised of three right angle sections which are utilized to comprise a horizontal section extending outward from the underground irrigation pipe, a vertical section extending upward to the ground level, a ground level horizontal section which extends from the vertical section and an upward vertical section extending upward to hold the sprinkler head. Each of the three sections, the two horizontal sections and the one vertical section are pivoted about right angle connections. However, this pivot usually is implemented with a threaded section which can result in leaking, etc. Once adequately assembled, the pivoting members allow the sprinkler head to "give" whenever impacted by equipment or by an individual walking over the sprinkler head. This reduces the incidence of damage, etc. However, this present system does not provide adequate versatility in that they use threaded sections. Therefore, there exists a need for an improved pivot joint for use in this type of sprinkler apparatus.

SUMMARY OF THE INVENTION

The present invention disclosed and claimed herein comprises a pivoting elbow for an irrigation system. The pivoting elbow includes an elbow having a bore formed therein at a substantially 90° angle with a pivoting opening and a fixed opening. The fixed opening is connected to a length of pipe and the pivoting opening is also connected to a length of pipe. The pivoting opening has an inner diameter that is larger by a predetermined amount than the outer diameter of the pivoting pipe. The pivoting pipe is disposed on the end thereof and inserted into the housing a rim that provides an effective outer diameter substantially equal to the inner diameter of the housing. An O-ring is provided that is disposed over the outer diameter of the pivoting pipe at a point proximate to the rim, the thickness of the O-ring being slightly larger than the thickness between the outer diameter of the pivoting pipe and the inner diameter of the housing. A stop member is provided which is cylindrical in shape having an inner diameter that is slightly larger than the outer diameter of the pivoting pipe and an outer diameter that is slightly less than the inner diameter of the pivoting opening in the housing. A seal is provided between the outer surface of the stop and the inner surface of the housing.

In another aspect of the present invention, the O-ring is disposed between the interior edge of the stop and the rim on the end of the pivoting pipe. In assembly, the pivoting end of the pipe and the rim thereon are disposed in the pivoting opening of the elbow. The O-ring is then disposed thereover and pressed down into the bore of the opening to a point that extends downward into the opening farther than the length of the stop. The stop is then slidingly engaged with the outer surface of the pivoting pipe and disposed downward to a point proximate to the pivoting opening. Cement or other adhesive is then disposed over the exterior surface of the stop and then the stop pushed down into the bore of the opening to provide a seal therewith. After the adhesive has cured, the pivoting opening can be pulled outward to allow the O-ring and the rim to come into engagement with the lower end of the stop.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
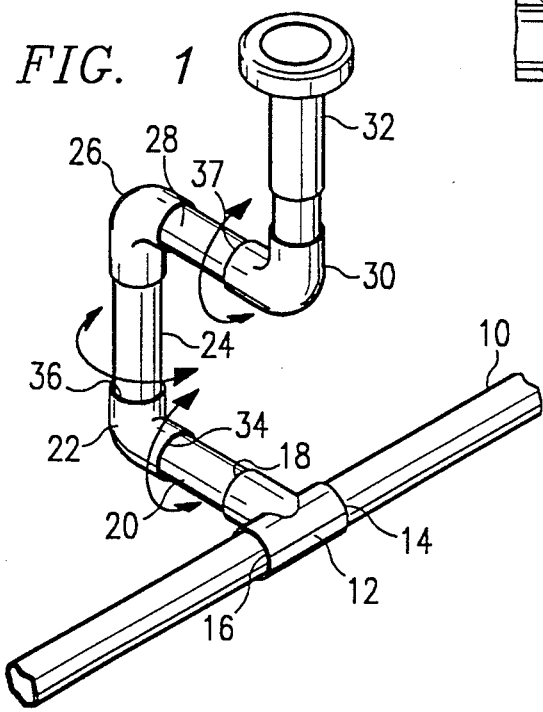
FIG. 1 illustrates a prospective view of the pivoting sprinkler apparatus of the present invention.

Referring now to FIG. 1, there is illustrated a perspective view of the pivoting apparatus of the present invention. An underground pipe 10 is provided which is buried beneath the ground and provides pressurized water for irrigation purposes. The apparatus is generally attached to the pipe 10 with the use of a Tee 12. The Tee 12 is comprised of an in-line sections 14 and 16 which are attached to either ends of a gap in the pipe 10 and a perpendicular section having an opening 18. For illustrative purposes, all of the pipe sections described herein will be of polyvinylchloride (PVC) construction. However, it should be understood that other similar type of materials could be utilized.

The perpendicular section with opening 18 is oriented with respect to the plane of the pipe 10 such that it is in the same plane thereof and extends outward horizontally to the longitudinal axis of the pipe 10. A length of pipe 20 is disposed in the opening 18 of the Tee 12 and cemented thereto to provide a fixed seal. The other end of the length of pipe 20 is pivotally inserted into a pivoting elbow 22. Pivoting elbow 22 has a first pivoting end which is interfaced with pipe 20 and a second pivoting end which is operable to be disposed at 90° with respect to the pivoting end and generally oriented in an upward position.

A length of pipe 24 has one end thereof inserted in the second pivoting end of the pivoting elbow 22. The other end of the pipe 24 is fixedly inserted into the fixed end of elbow 26. The pipe 24 is generally oriented in an upward direction and of a length such that it is proximate to the surface of the ground above the plane of the pipe 10, approximately eight inches below the surface. The elbow 26 has two fixed ends disposed at right angle with respect to each other.

A length of pipe 28 has one end thereof inserted in the fixed end of the elbow 26 and cemented thereto to provide a fixed seal therewith. The other end thereof is pivotally inserted into the pivoting end of a pivoting elbow 30. The other end of the pivoting elbow 30 is a fixed end and is oriented generally in the upward direction and interfaces with a sprinkler head 32. Typically, the fixed end of the pivoting elbow 30 can either be a cemented connection or a threaded connection for interfacing with the sprinkler head 32. The sprinkler head 32 can be any conventional type of sprinkler head which can take many forms, depending upon the application.

In operation, there are three pivoting joints, the first pivoting joint is at a junction 34 at the pivoting end of the pivoting elbow 22. The second pivoting joint is defined at a junction 36 at the end of the second pivoting end of elbow 22 and a third pivoting joint is defined at a junction 37 at the pivoting end of the pivoting elbow 30. The pivoting elbow 22 pivots about the junction 34 and about the length of pipe 20. In a similar manner, the pivoting elbow 22 pivots about the junction 36 and about the length of pipe 24 and the pivoting elbow 30 pivots about the junction 37 and about the length of pipe 28.

If a force is imparted to the top of the sprinkler head 32 in a direction substantially horizontal with respect to the surface of the ground, the pivoting elbow 30 will pivot, thus allowing the sprinkler head 32 to rotate downward to a horizontal position relative to the ground. In addition, if the force is strong enough, the pivoting elbow 22 may rotate to relieve some of the stress and also allow the sprinkler head 32 to rotate out of the way of the structure imparting the force. If the force is significant, the pivoting elbow 22 may rotate downward, such as for vertically directed forces which may be present when a vehicle is riding over the sprinkler head. For example, a vehicle may drive directly on top of the sprinkler head which would result in the sprinkler head 32 being forced downward into the earth about the pivoting elbow 30 and then the pivoting elbow 22 rotating to allow the entire mechanism to decrease its general overall height relative to the ground and the position of the pipe 10 underneath the ground.

Figure 2:
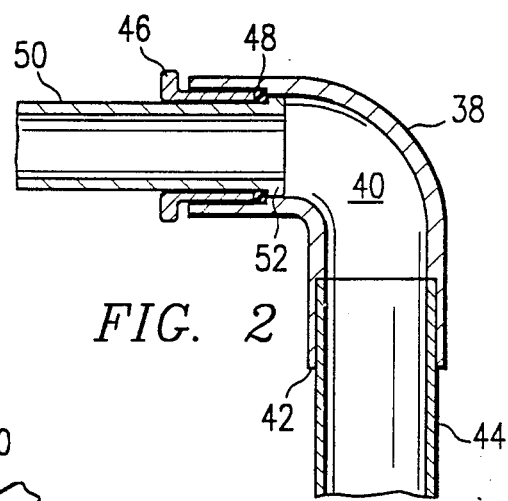
FIG. 2 illustrates a cross-section through one of the pivoting joints in the pivoting apparatus.

Referring now to FIG. 2, there is illustrated a cross-section of one of the pivoting elbow 30, the pivoting elbow generally has an outer casing or an outer housing 38 which forms the general 90° configuration, the housing 38 having an interior 40 through which fluids pass. The housing 38 is a conventional PVC elbow which is operable to be cemented to the male end of a length of PVC pipe. The housing 38 has a fixed end 42 which is operable to receive a length of PVC pipe 44. On the opposite end, a stop 46 is inserted into the end of the housing 38 with an O-ring 48 disposed on the interior rim thereof. The stop 46 is cemented to the interior surfaces of the housing 38. A length of pipe 50 is provided which has a diameter that is less than the interior of housing 38, the outside diameter of the pipe 50 being slightly smaller than the inside diameter of the stop 46 such that there is a sliding coaction therewith. The length of pipe 50 has a stop 52 formed on the end thereof that is disposed in interior chamber 40. The stop 52 is comprised of a rim having an outer diameter that is slightly smaller than the interior diameter of the housing 38 but larger than the interior diameter of the stop 46 such that the stop 52 cannot slide through the interior of the stop 46. The O-ring 48 is disposed between the rim end of the stop 46 and the stop 52. Therefore, the O-ring 48 provides a seal with the outer surface of the pipe 50 and the inner surface of the O-ring 48 and allows the pipe 50 to rotate relative to the stop 46. The thickness of the O-ring 48 is slightly larger than the distance between the two surfaces.

Figure 3:
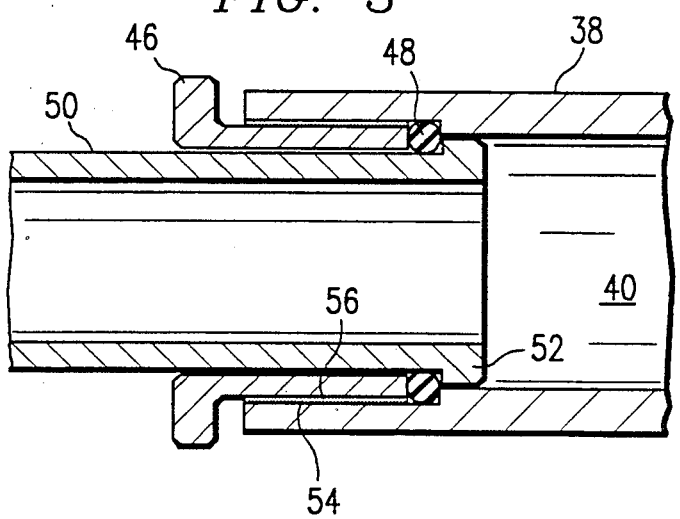
FIG. 3 illustrates a detailed cross-section of the actual pivoting member.

Referring now to FIG. 3, there is illustrated a more detailed diagram of the pivoting mechanism for the pivoting elbows 22, and 30. The interior surface of the housing 38 on the end thereof typically has a recess 54 formed thereon. This recess basically increases the interior diameter of the housing 38 proximate to the end thereof. The purpose for this is to allow the mating portion of a length of PVC pipe to easily insert therein and accommodate the cement, in addition to acting as a stop to prevent the pipe from being inserted too far therein. Therefore, the interior diameter in the recess is slightly larger than the outer diameter of a length of mating pipe, whereas the interior diameter of housing 38 further inward from the recess 54 is slightly less than the outer diameter of a piece of mating pipe. The outer diameter of the stop 52 is slightly less than the inner diameter of the housing 38 not including the portion in the recess 54. This allows the pipe 50 to be inserted farther into the housing 38. However, due to the right angle nature, the pipe 50 can only be inserted a finite distance into the housing 38. The stop 46, on the other hand, has an outer diameter that is slightly less than the inner diameter of the housing 38, exclusive of the recess 54. A cement-type material 56 is disposed between the housing 38 and the outer surface of the stop 46 in the recess 54 to provide a secure relationship with respect thereto. The O-ring 48 is disposed at the other end of the stop 46 such that it contacts both the interior walls of the housing 38 and the exterior surface of the pipe 50. In the preferred embodiment, the O-ring 48 is disposed between the inner end surface of the stop 46 and the stop 52. However, the stop 52 could coact with the end of the stop 46, with a portion protruding beyond the stop 52 to allow an O-ring to provide a seat therewith.

Figure 4:
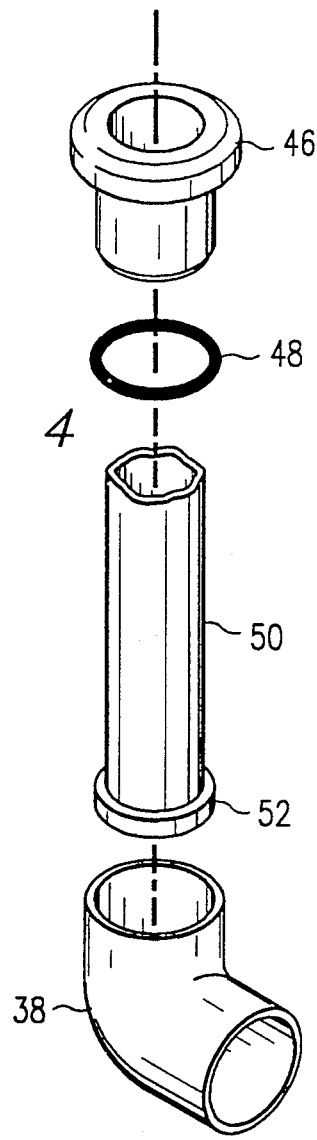
FIG. 4 illustrates an exploded view of the pivoting member.

Referring now to FIG. 4, there is illustrated a blow-up view of the pivoting elbows 22, and 30, illustrating the assembly procedure. The outer housing 38 is disposed to first receive the stop 52 on the end of the pipe 50. The O-ring 48 is then disposed over the outer surface of the pipe 50 in an abutting relationship with the stop 52. This assembly is then inserted into the housing 38. The stop 46 is then disposed over the pipe 50 and slipped down to a point just proximate to the pivoting opening on the housing 38. Glue is then applied to the exterior surface of the stop 46 and the stop 46 then inserted into the opening 38. It is important that the glue or cement not contact the outer surface of the pipe 50, since this may result in adhesion between the outer surface of the pipe 50 and the interior surface of the stop 46, or alternatively, the outer surface of the pipe 50 with the stop 52 in the interior surface of housing 38. This would inhibit rotational motion.

In this assembly method, a minimum component count and a relatively inexpensive pivoting joint is provided which can easily be assembled. The housing 38, the stop 46 and the O-ring 48 are standard components whereas the length of pipe 50 with the stop 52 formed on the end thereof would be a separately manufactured item.

Although the preferred embodiment has been described in detail, it should be understood that various changes, substitutions and alterations can be made therein without departing from the spirit and scope of the invention as defined by the appended claims.

What is claimed is:

1. A pivoting sprinkler assembly, comprising;
   a Tee member for inserting in an irrigation pipe and having a first end and a second end in series for being inserted in line with said pipe, and a third end being attached to the sprinkler assembly;
   first, second and third elbows, said first elbow having first and second pivoting ends, said second elbow having first and second fixed ends and said third elbow having a pivoting end and a fixed end;
   a first length of pipe disposed between the third opening in said Tee and the first pivoting end of said first elbow, said first length of pipe and said Tee being essentially in the same plane as said irrigation pipe;
   a second length of pipe disposed between the second pivoting end of said first elbow and the first fixed end of said second elbow and generally having the longitudinal axis thereof directed upward from the plane of said irrigation pipe;
   a third length of pipe having one end thereof fixedly attached to the second fixed end of said second elbow and the other end thereof pivotally attached to the pivoting end of said third pivoting elbow, said second length of pipe generally disposed in a plane parallel to the plane of said irrigation pipe; and
   a sprinkler head for being disposed in the fixed end of said third pivoting elbow and directed upward from the plane of said third length of pipe;
   each of the pivoting ends of said first and third pivoting elbows comprising:
   an elbow housing having a generally circular bore with a substantially 90° bend in the center thereof and both ends thereof being open;
   a first seal for sealing one of the openings in said housing to the end of a length of pipes;
   the other opening of said housing comprising the pivoting opening for receiving the end of a length of pipe and having a larger inner diameter than the outer diameter of the received end of the pipe;
   a rim disposed on the received end of the pipe when the received end of the pipe is disposed in the housing through said pivoting opening, said rim having an effective outer diameter slightly less than the inner diameter of said pivoting opening;
   a stop disposed on the inner wall of said pivoting opening between the outermost edges thereof relative to said housing and said rim, when said rim and the received end of the pipe are disposed in said pivoting opening, said stop having an effective inner diameter that is slightly larger than the outer diameter of the received end of the pipe; and
   an O-ring disposed about the outer surface of the received end of the pipe at a point interior to said housing relative to said stop and providing a seal between the outer surface of the received end of the pipe and the inner surface of said housing.

2. The pivoting joint of claim 1 wherein said O-ring is disposed between said rim and said stop.

3. The pivoting joint of claim 1 wherein said stop is comprised of a cylindrical member having a bore formed therethrough with an inner diameter that is slightly larger than the outer diameter of the received end of the pipe and an outer diameter that is slightly less than the inner diameter of said pivotal opening wherein said cylindrical member is operable to be inserted into said pivoting opening after insertion therein of the received end of the pipe, said rim and said O-ring and a fixed seal provided between the outer surface of said cylindrical member and the inner surface of said pivoting opening to provide a seal therewith.

4. The pivotal joint of claim 3 wherein said housing and said cylindrical member are fabricated from a PVC material and said seal is provided by a cement.

* * * * *